July 13, 1954

J. P. M. DROIN ET AL 2,683,371

LIQUID LEVEL INDICATOR

Filed March 9, 1951

INVENTOR
Jacques P. M. Droin
François R. Bonhomme
BY
Haseltine, Lake & Co
AGENTS July 13, 1954

J. P. M. DROIN ET AL

2,683,371

LIQUID LEVEL INDICATOR

Filed March 9, 1951

INVENTOR
JACQUES P. M. DROIN
FRANCOIS R. BONHOMME
BY
Haseltine, Lake & Co.
AGENTS

July 13, 1954  J. P. M. DROIN ET AL  2,683,371
LIQUID LEVEL INDICATOR
Filed March 9, 1951  6 Sheets-Sheet 5

INVENTOR
JACQUES P. M. DROIN
FRANCOIS R. BONHOMME
BY
Haseltine, Lake & Co.
AGENTS July 13, 1954

J. P. M. DROIN ET AL 2,683,371

LIQUID LEVEL INDICATOR

Filed March 9, 1951

INVENTOR
JACQUES PAUL MARCEL DROIN
FRANÇOIS ROBERT BONHOMME
BY
Haseltine, Lake & Co.
AGENTS Patented July 13, 1954

2,683,371

UNITED STATES PATENT OFFICE 2,683,371

LIQUID LEVEL INDICATOR

Jacques Paul Marcel Droin, Lyon, and François Robert Bonhomme, Gennevilliers, France, assignors to Societe de Brevets pour les Applications de l'Electronique (S. B. A. E.), Asnieres, (Seine), France, a society of France Application March 9, 1951, Serial No. 214,776

Claims priority, application France March 16, 1950

11 Claims. (Cl. 73—304)

The present invention relates to apparatus for indicating at a distance the level of a liquid in a tank or other vessel.

The object of our invention is to provide an apparatus of this kind which is better adapted to meet the requirements of practice than those existing at the present time.

Preferred embodiments of our invention will be hereinafter described with reference to the accompanying drawings, given merely by way of example and in which.

Figure 1:
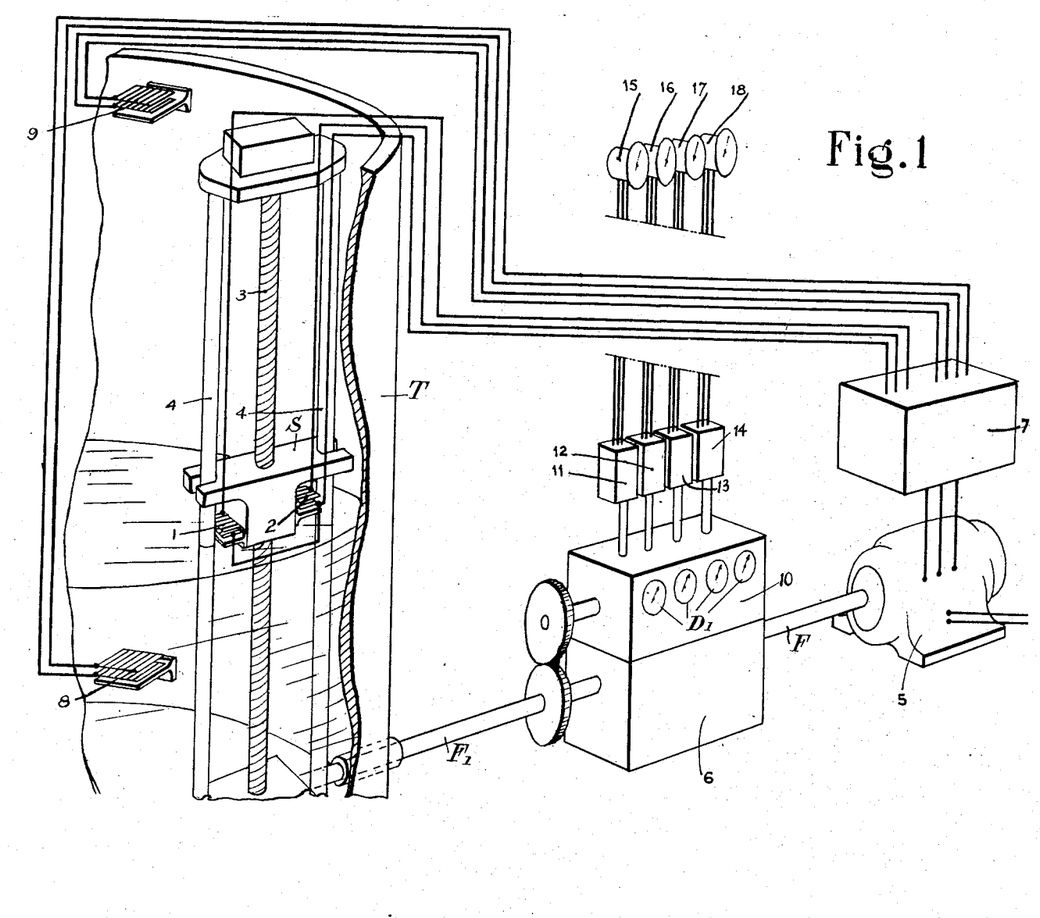
Fig. 1 is a diagrammatic perspective view illustrating the principle of our invention.

The device shown by Fig. 1 is intended to indicate the level of a liquid in a tank T.

A screw 3 is disposed vertically in said tank. On this screw is engaged a support S guided by two vertical rods 4. Support S carries two liquid level sensitive variable electrical reactive elements 1 and 2, carried at slightly different levels with respect to each other. For instance, element 2 is located at a level slightly above that of element 1.

The expression "liquid level sensitive variable electrical reactive element" means an element which reacts differently, from an electrical point of view, according as it is above or below the liquid level. By way of example, in the embodiment illustrated by Fig. 1, these elements are constituted by capacitors. Each of these capacitors is essentially constituted, in this construction, by two metal grids parallel to each other and which form the conductors of this capacitor, whereas the dielectric is constituted by the space between these grids. Of course, the capacitance of such a capacitor is very different according as it is immersed in the liquid or located in the atmosphere above the level of this liquid.

Screw 3 is rotatable in journals located at the top and bottom of tank T and it is driven by an electric motor 5. Thus, rotation of this motor in one direction or the other causes support S to move upwardly or downwardly in tank F.

The movement of motor 5 is transmitted through a shaft F to a reducing gear 6 and thence through a shaft $F_1$ to screw 3.

The movement of shaft $F_1$ is transmitted through a speed reducing mechanism 10 to dials $D_1$ which indicate the height of the liquid level in tank T.

The indications of dials $D_1$ are teletransmitted through suitable circuits including devices 11, 12, 13, 14, for instance of the Selsyn type, to dials 15, 16, 17, 18.

Now, operation of electric motor 5 is controlled as follows:

Running of this motor in either direction is controlled by two circuits C and Ca (Fig. 4) so that when no current is flowing through either of these circuits, the motor is stopped whereas, when current is flowing through circuit C, motor 5 is made to run in the direction which causes the support S of elements 1 and 2 to move downwardly and when current is flowing through circuit Ca, motor 5 is made to run in the opposite direction, which causes support S to move upwardly.

Figure 2:
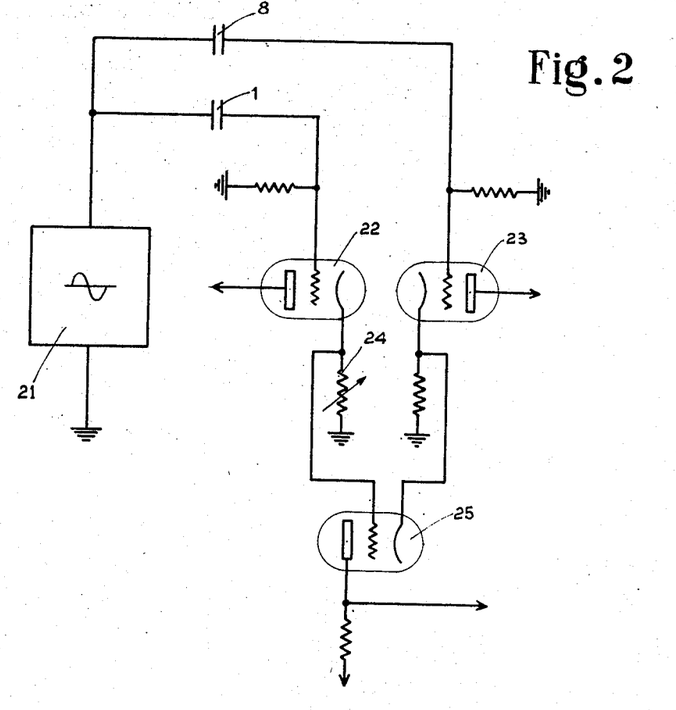
Fig. 2 diagrammatically shows one of the electric circuits of the apparatus of Fig. 1.

The essential elements of circuit Ca are shown by Fig. 2. This circuit includes the lower liquid level sensitive element, to wit capacitor 1. It further includes a similar capacitor 8 of the same capacitance located in fixed position at the bottom of tank T so as to be constantly immersed in the liquid of this tank. Both of these capacitors 1 and 8 have one plate connected with a source of low frequency alternating current 21. Each of the two other plates of said capacitors is connected with the grid of a triode 22, 23 respectively. If both of the capacitors 1 and 8 are in the same medium, i. e. if capacitor 8 is below the liquid level (as it is normally), the voltages on these grids are in phase and practically equal (the differences being due to unequalities in the characteristics of the conductors through which they are connected with their respective capacitors). The cathode voltages of tubes 22 and 23, balanced by means of a variable resistance 24, are transmitted to the grid and the cathode respectively of a tube 25 which therefore gives a practically zero voltage across its plate circuit under normal conditions. But if capacitor 1, due to a drop of the liquid level in tank T, ceases to be immersed in the liquid, its capacitance ceases to be equal to that of capacitor 8. The grid voltage of tube 22 increases and a low frequency voltage is produced across the plate circuit of plate 25. This voltage is amplified (Fig. 4) and serves to energize motor 5 in one direction.

It is pointed out that this arrangement operates the electric motor in response to an unbalance between the actual capacitances of capacitors 1 and 8 as is produced when capacitor 1 ceases to be immersed in the liquid, irrespective of the absolute value of the variation of capacitance of element 1 when it passes from the liquid into the atmosphere about the level of said liquid. Thus, our apparatus can be applied to different liquids.

The other circuit Ca includes movable capacitor 2 (mounted on support S slightly above the level of capacitor 1) and a fixed capacitor 9 located at the top of tank T and of a capacitance equal to that of capacitor 2 (when said element 2 is above the liquid level). It is similar in arrangement with circuit C but connected with motor 5 in such manner that any unbalance between the actual capacitances of elements 2 and 9 (due to the fact that the liquid level rises in tank T and passes above element 2) produces a current which operates motor 5 in the direction which moves the support of capacitors 1 and 2 upwardly.

It will be readily understood that, with such a system, support S is automatically displaced by motor 5 so that capacitors 1 and 2 are always restored to a position such that one of them is just below the liquid level and the other just above this level. As the rotation displacements of the shaft F of motor 5 are also transmitted to the indicating means constituted by dials D1 and 15, 16, 17, 18, these means constantly indicate the height of the liquid level in tank T.

Figure 4:
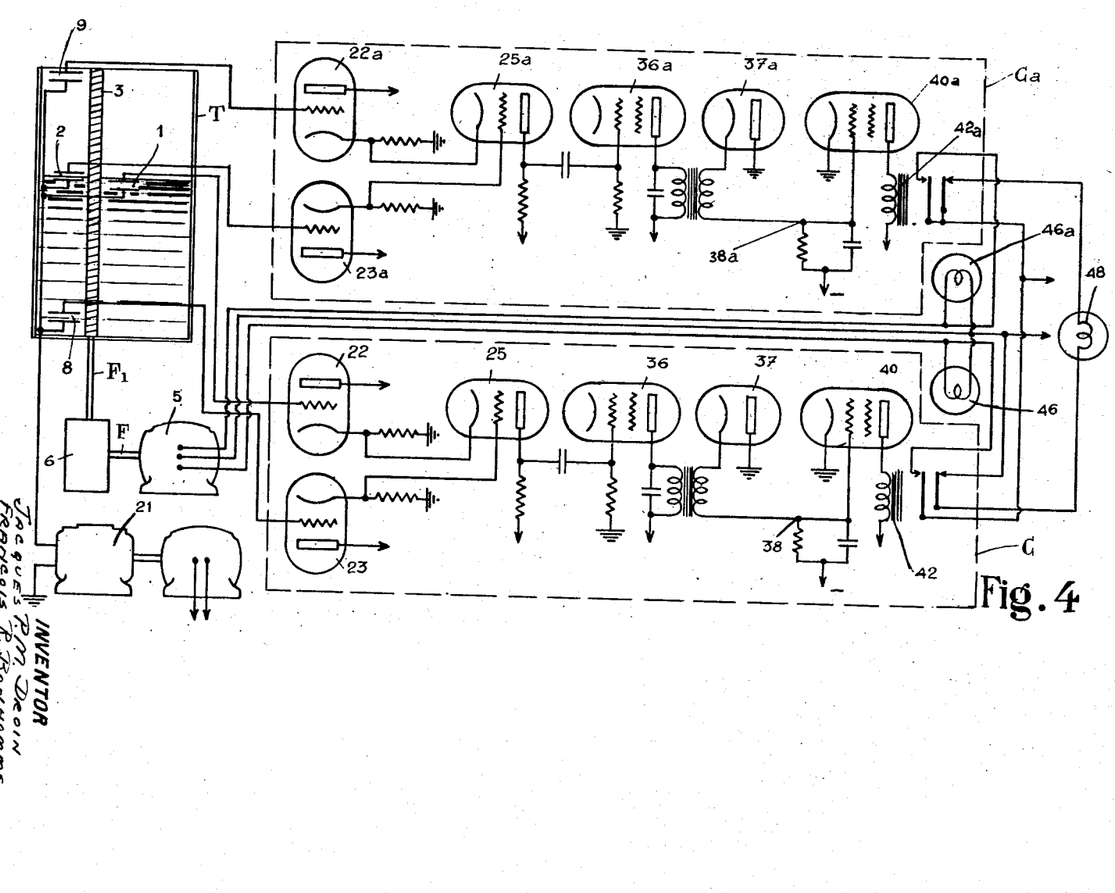
Fig. 4 shows the electric lay-out of our apparatus.

Fig. 4 is a more complete disclosure of the electric lay-out of the device. Circuits C and Ca include the same elements, designated by the same reference numerals (with index a for the elements of circuit Ca). Taking for instance circuit C it comprises, in addition to the elements 22, 23 and 25, already referred to with reference to Fig. 2, amplifying and detecting means 36—37 which supply a positive direct voltage at 38 when there is an unbalance between capacitors 1 and 8. This voltage causes current to flow through a tube 40 which, under normal conditions, is negatively biased beyond cut-off. The current thus produced actuates a relay 42 for operating motor 5 in one direction. An electric lamp 46 is switched on when motor 5 is thus running.

An electric lamp 48 is switched on when motor 5 is stopped and support S is stationary in a position indicating the liquid level.

The source of low frequency alternating current 21 is common to both circuits C and Ca.

All this electric system is enclosed in a box shown at 7 on Fig. 1.

Figure 3:
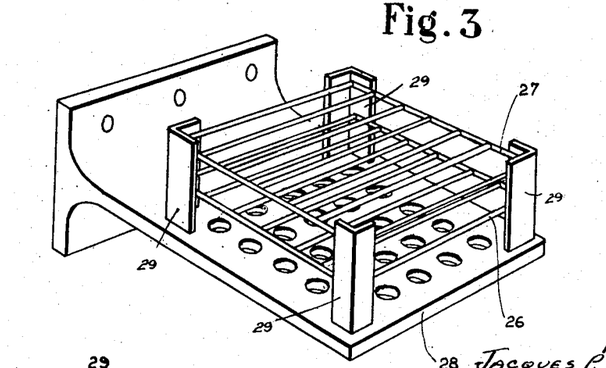
Fig. 3 is a perspective view on an enlarged scale of one of the liquid level sensitive elements of this apparatus.

Fig. 3 shows an embodiment of one of the capacitors above referred to. The conductor elements are constituted by grids 26 and 27 each consisting of parallel thin metal wires and carried by insulating supports 29 mounted on a base plate 28 provided with holes for an easy flow of the liquid therethrough.

Figure 5:
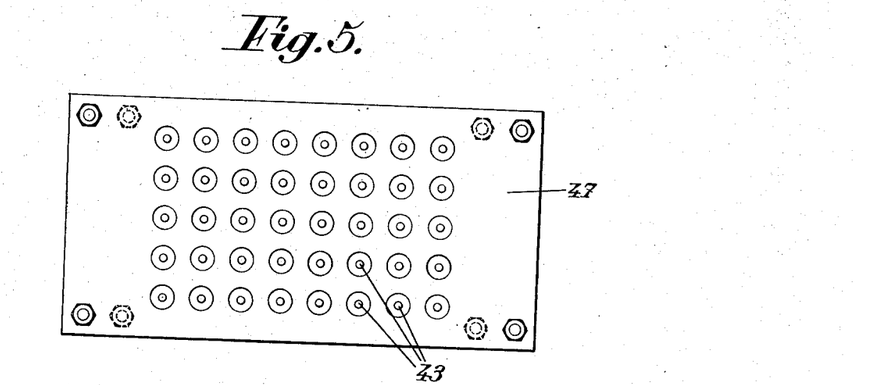
Figs. 5, 6 and 7 are a bottom plan view, a vertical sectional view and a perspective view of another kind of liquid level sensitive element for use according to our invention.
Figure 6:
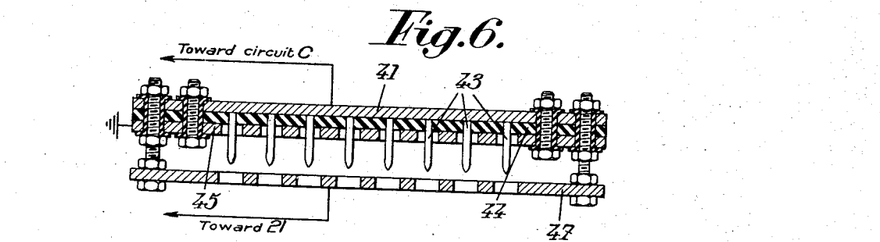
Figure 7:
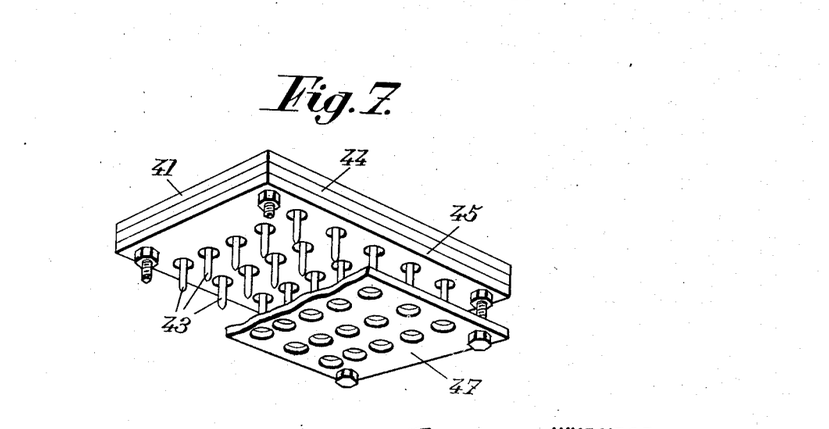

Figs. 5 to 7 show another, and preferred, embodiment of a capacitor to be used in a device according to our invention.

This capacitor includes a first electrode having a horizontal conductor plate 41 and a multiplicity of metallic points 43 the lower ends of which are all located in the same horizontal plane. The other electrode is constituted by another horizontal conductor plate 47 secured through insulating rods to plate 41 at a distance under the horizontal plane of the lower ends of points 43.

A grounded screen 45, provided with holes for the passage of points 43, is interposed between plates 41 and 47, this screen being separated by an insulating plate 47 from plate 41.

Plate 47 is provided with a multiplicity of holes for the flow of the liquid therethrough, in order to facilitate displacements of said plate in the liquid.

The advantage of this construction is that the forces due to the surface tension of the liquid, which, in constructions of the kind of that of Fig. 3, tend to oppose vertical displacements of the capacitor when its elements are to pass through the liquid free surface are eliminated.

Figure 8:
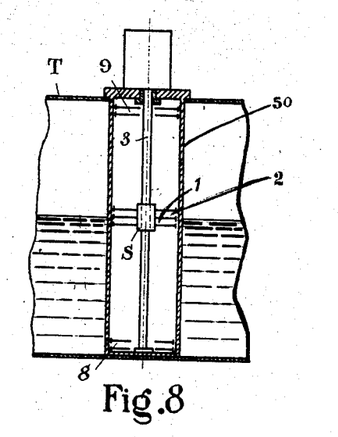
Fig. 8 is a diagrammatic vertical sectional view of a modification.

Fig. 8 shows a modification of the construction of Fig. 1 according to which capacitors 1 and 2, instead of being located directly in contact with the liquid and gas (air) present in tank T, are located in a fluidtight vertical chamber limited by a wall 50 and containing support S and screw 3. Wall 50 is made of an insulating material. The electrical lines of force between the plates of the capacitors extend partly to the outside of the chamber limited by wall 50 and the presence of liquid at the level of the space between these plates of course modifies the capacitance of the capacitor which is concerned.

Figure 9:
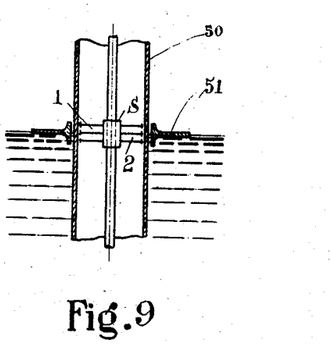
Figs. 9 and 10 are similar views relating to other modifications.

In the modification of Fig. 9, which is based upon the same principle, the variation effect is improved by providing, slidable vertically around wall 50, a float 51 of a material having a dielectric constant as high as possible.

Figure 10:
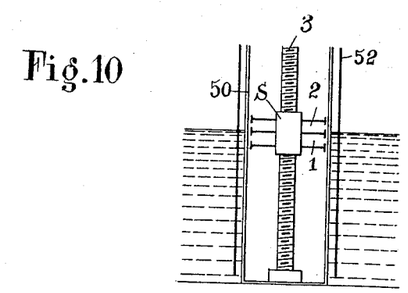

The construction of Fig. 10 is similar to that of Fig. 8, but further includes an insulated metal electrode 52 surrounding wall 50 intended to improve the sensitiveness of the system.

Figure 11:
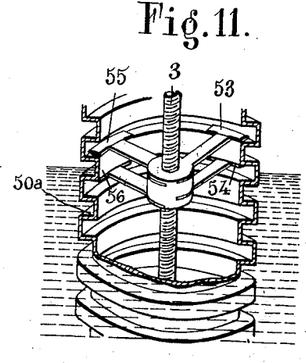
Fig. 11 is a perspective view of still another modification.

In the modification of Fig. 11, the capacitors are still located inside a closed chamber limited by a wall 50a of an insulating material. But the inner and outer faces of this wall are in the form of square thread screws and the plates 53, 54 and 55, 56 of the two capacitors (analogous to capacitors 1 and 2 of Fig. 1) are applied against the top and bottom faces of the screw thread, both of the capacitors receiving bodily a rotation movement from rod 3, along which they can slide axially so as to move helically along wall 50a. Thus liquid is present between the plates of the capacitors. The lines of force between the plates of the capacitors are vertical.

Figure 12:
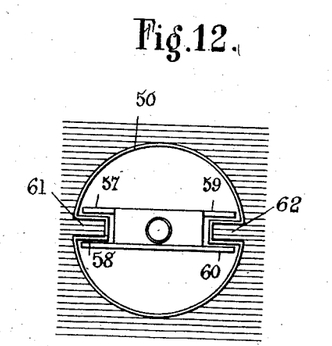
Fig. 12 is a horizontal cross-section of still another modification.

In the modification of Fig. 12, the plates 57—58, 59—60 of the capacitors, instead of being horizontal, are vertical and slide along the sides of vertical grooves 61 provided on opposite sides of insulating wall 50. In this case also, liquid is present between the plates of the capacitors. The lines of force are horizontal.

Figure 13:
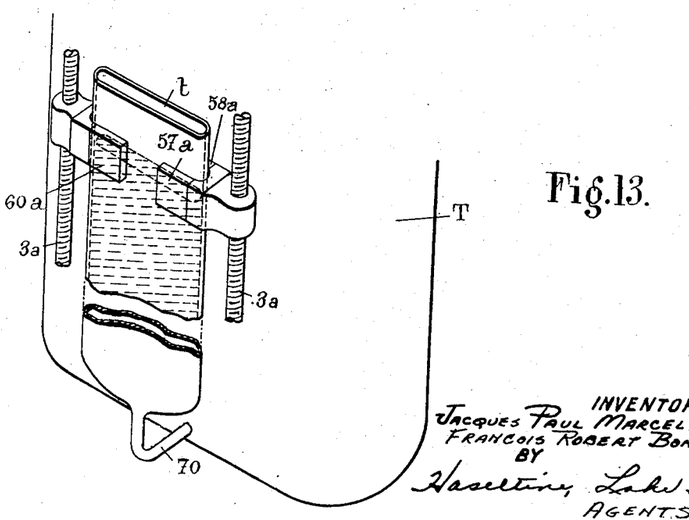
Fig. 13 is a perspective view of still another modification.

In the embodiment of Fig. 13, the two capacitors 1a and 2a are located on the outside of the tank T which communicates at 70 with a flat vertical tube t so that the liquid in tube t is at the same level as in the tank. The two condensers, which are driven simultaneously by two screws 3a and 3b have their respective plates (such as 57a and 58a for one condenser, only one plate, 60a, of the other condenser being visible on the drawing) located on either side of tube t, so that in this case also the liquid is present between the plates of each capacitor.

In the description of Figs. 10 to 13, we have only shown the moving capacitors, to wit 1 and 2 in Fig. 10, 53—54 and 55—56 in Fig. 11, 57—58 and 59—60 in Fig. 12, 57a—58a and 60a in Fig. 13, because the structure, location and manner of moving these capacitors constitute the distinctive features of these modifications. But of course the indicator device, in any of these modifications, includes two fixed capacitors similar in structure to the two above mentioned moving capacitors, respectively, and located similarly to the reference capacitors 8 and 9 of Fig. 1. As for the electric circuits, motor and indicator means, they are similar to those described with reference to Figs. 1 to 4.

Figure 15:
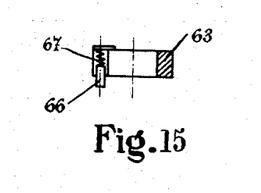
Figure 16:
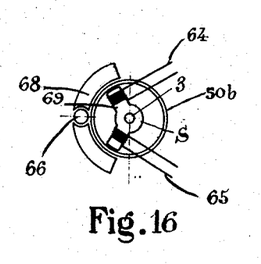
Fig. 16 is a horizontal cross section of a modification.

In all the above described embodiments of our invention, the liquid level sensitive variable electrical reactive elements 1 and 2 consist of capacitors. It should be well understood that our invention is not limited to this case. For instance, Figs. 14-15 and 16 show examples of variable inductance elements.

Figure 14:
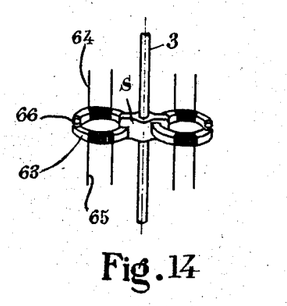
Figs. 14 and 15 are a perspective view and a vertical section of another embodiment of our invention.

In the embodiment of Fig. 14, the left hand side liquid level sensitive element includes apparatus characterized by an annular ring 63 of magnetic material carrying two windings 64 and 65 to form a magnetic circuit. Between these windings, there is a space in ring 63 forming a gap in the magnetic circuit and in this space there is vertically slidable a magnetic member 66, preferably held by a spring 67. When this device is located outside of the liquid, member 66 is in its lower position and the gap in the magnetic circuit 63 exists. On the contrary, when the device comes into contact with the liquid, the upward thrust exerted on member 66 causes it to close the gap in said magnetic circuit 63.

Therefore, if an alternating current is fed to winding 64, the alternating current collected from winding 65 is different according as the device is above or below the liquid level.

The other element carried by support S (on the right hand side thereof) is similar, but its magnetic circuit is located at a level slightly above that of core 63.

Both of the primary windings of these elements are fed with alternating current, for instance of low frequency, say 1,000 periods. The currents flowing through the secondary windings are supplied to a double primary of a transformer so as to give zero current in the secondary thereof when each element is in the same state as the corresponding reference element (one at the top, the other at the bottom of the tank), i. e. when one of the liquid level sensitive elements is just above the liquid level and the other just below this level. When the liquid level varies, there is an unbalance in one of the circuits and the transformer delivers a current in one direction or the other to operate the motor which drives screw 3 and the indicating means.

In the modification of Fig. 16, the windings 64 and 65 are carried by a portion 69 of the magnetic circuit located inside a fluidtight chamber separated from the inside of the tank by a partition 50b. This portion 69 of the magnetic circuit is constituted by a magnet and therefore holds, through partition 50b, the remainder 68 of the magnetic circuit.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A device for measuring and indicating the height in a vessel of the level of the surface of separation of a liquid and another fluid located above said liquid, which device comprises, in combination, a support within the vessel and movable vertically with respect to said vessel, two liquid level sensitive variable electrical reactive means carried by said movable support within the vessel and in fixed position with respect to said movable support, one of said means being located at a level slightly above that of the other, two reference electrical reactive means similar to said two first mentioned means respectively, mounted, one in a position constantly above the liquid level and the other in a position constantly below the liquid level, an electric motor, means operative by said motor for moving said support upwardly and downwardly, indicator means operative by said motor in response to the working thereof, and two electrical circuits for controlling said motor, one of these circuits including the first mentioned reference means and the variable means located at a level above that of the other variable means and the other circuit including the second mentioned reference means and the variable means located at a level below that of the other variable means, each of these circuits being adapted to supply no current when the reference and variable means thereof are located both between the top and bottom levels of the same medium and to supply current when the variable means thereof is above or below the level between the mediums in a direction away from the reference means thereof, the first mentioned circuit being arranged to operate said motor in the direction which moves said support upwardly and the second mentioned circuit being arranged to operate said motor in the direction which moves said support downwardly.

2. A device for measuring and indicating the height in a vessel of the level of the surface of separation of a liquid and another fluid located above said liquid, which device comprises, in combination, a support within the vessel and movable vertically with respect to said vessel, two liquid level sensitive capacitors within the vessel and carried by said movable support in fixed position with respect to said movable support, one of said capacitors being located at a level slightly above that of the other, two other liquid level sensitive capacitors similar to said two first mentioned capacitors respectively, mounted in fixed position with respect to said vessel, one in a position constantly above the liquid level and the other in a position constantly below the liquid level, an electric motor, means operative by said motor for moving said support upwardly and downwardly, indicator means operative by said motor in response to the working thereof, and two electrical circuits for controlling said motor, one of these circuits including the first mentioned fixed capacitor and the movable capacitor located at a level above that of the other movable capacitor and the other circuit including the second mentioned fixed capacitor and the movable capacitor located at a level below that of the other movable capacitor, each of these circuits being adapted to supply no current when the fixed and movable capacitors thereof are located both in the same medium and to supply current when the movable capacitor thereof is in a medium different from the fixed capacitor thereof, the first mentioned circuit being arranged to operate said motor in the direction which moves said support upwardly and the second mentioned circuit being arranged to operate said motor in the direction which moves said support downwardly.

3. A device according to claim 2 in which said capacitors are located in said vessel, in direct contact with the liquid and other fluid present therein.

4. A device according to claim 2 in which said capacitors are located in said vessel, in direct contact with the liquid and other fluid present therein, each of said capacitors being constituted by two superposed grids forming the electrodes thereof.

5. A device according to claim 2 in which said capacitors are located in said vessel, in direct contact with the liquid and other fluid present therein, each of said capacitors being constituted by an upper conductor plate and a plurality of pointed conductor rods extending downwardly from said point, a layer of an insulating material applied against the under face of said plate, a screen carried on the under side of said layer provided with a plurality of holes for affording passage of said pointed rods with a substantial clearance, and a plate parallel to the first mentioned plate located below the level of the lower ends of said rods.

6. A device for measuring and indicating the height in a vessel of the level of the surface of separation of a liquid and another fluid located above said liquid, which device comprises, in combination, an insulating partition forming a vertical fluidtight chamber in said vessel, said partition being surrounded by and in contact with said liquid and said fluid, a support positioned in and movable vertically in said chamber, two liquid level sensitive capacitors carried by said movable support in fixed position with respect thereto and in close proximity to the inner surface of said partition so that lines of force will extend partly to the outside of the chamber, one of said capacitors being located at a level slightly above that of the other, two other liquid level sensitive capacitors similar to said two first mentioned means respectively, mounted in fixed position in said chamber, one in a position constantly above the liquid level and the other in a position constantly below the liquid level, said other capacitors being mounted in said chamber so that lines of force will extend to the outside of said partition, an electric motor, means operative by said motor for moving said support upwardly and downwardly, indicator means operative by said motor in response to the working thereof, and two electrical circuits for controlling said motor, one of these circuits including the first mentioned fixed capacitor and the movable capacitor located at a level above that of the other movable capacitor and the other circuit including the second mentioned fixed capacitor and the movable capacitor located at a level below that of the other movable capacitor, each of these circuits being adapted to supply no current when the fixed and movable capacitors thereof are located both between the top and bottom levels of the same medium and to supply current when the movable capacitor thereof is above or below the level between the mediums in a direction away from the fixed capacitor thereof, the first mentioned circuit being arranged to operate said motor in the direction which moves said support upwardly and the second mentioned circuit being arranged to operate said motor in the direction which moves said support downwardly.

7. A device according to claim 6 further including a sleeve of a conductor material carried by said vessel around said partition.

8. A device according to claim 1 in which each of said means includes apparatus forming a magnetic circuit having a gap therein and a primary and secondary winding on opposite sides of the gap, and a magnetic member movable with respect to said magnetic circuit normally located outside of said gap and responsive to the buoyant thrust of said liquid so as to fill said gap when the means in question is immersed in said liquid.

9. A device according to claim 2 in which the wall of said vessel forms at least one flat hollow ridge the inside of which forms a portion of the inside of said vessel intended to receive liquid, said capacitors including each two plates located on opposite faces of said ridge respectively and slidable therealong, so that the lines of force extending between these two plates pass across the liquid present inside said ridge.

10. A device for measuring and indicating the level of a liquid in a tank, which device comprises, in combination, a flat tube extending vertically along said tank on the outside thereof, this flat tube communicating with the inside of said tank so that the liquid surface is at the same level in said tube as in said tank, a support movable vertically along said flat tube, two liquid level sensitive capacitors carried by said movable support in fixed position with respect thereto, one of said capacitors being located at a level slightly above that of the other, two other liquid level sensitive capacitors similar to said two first mentioned capacitors respectively, mounted in fixed position with respect to said tank, one in a position constantly above the liquid level and the other in a position constantly below the liquid level, each of said capacitors being constituted by two plates located on either side of said flat tube on one edge of said tube, the two first mentioned capacitors being located on opposite edges of said tube and slidable simultaneously along said edges, an electric motor, means operative by said motor for moving said support upwardly and downwardly, indicator means operative by said motor in response to the working thereof, and two electrical circuits for controlling said motor, one of these circuits including the first mentioned fixed capacitor and the movable capacitor located at a level above that of the other movable capacitor and the other circuit including the second mentioned fixed capacitor and the movable capacitor located at a level below that of the other movable capacitor, each of these circuits being adapted to supply no current when the fixed and movable capacitors thereof are located both between the top and bottom levels of the same medium and to supply current when the movable capacitor thereof is above or below the level between the mediums in a direction away from the fixed capacitor thereof, the first mentioned circuit being arranged to operate said motor in the direction which moves said support upwardly and the second mentioned circuit being arranged to operate said motor in the direction which moves said support downwardly.

11. A device according to claim 8 in which said magnetic circuits are located in the vessel in direct contact with the liquid present therein.

References Cited in the file of this patent

UNITED STATES PATENTS

| Number | Name | Date |
|---|---|---|
| 2,354,945 | Cohen et al. | Aug. 1, 1944 |

FOREIGN PATENTS

| Number | Country | Date |
|---|---|---|
| 308,939 | Germany | Sept. 2, 1917 |
| 441,576 | Great Britain | Jan. 22, 1936 |
| 114,980 | Sweden | Sept. 18, 1945 |